United States Patent
Brown-Tsai et al.

(10) Patent No.: US 11,565,962 B2
(45) Date of Patent: Jan. 31, 2023

(54) METHOD AND APPARATUS FOR CONTROLLING THICKNESS OF GLASS SHEET

(71) Applicant: CORNING INCORPORATED, Corning, NY (US)

(72) Inventors: Jufe Adam Brown-Tsai, Nashville, TN (US); Frank Coppola, Horseheads, NY (US); Hung Cheng Lu, Ithaca, NY (US); William Anthony Whedon, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 970 days.

(21) Appl. No.: 15/570,158

(22) PCT Filed: Apr. 29, 2016

(86) PCT No.: PCT/US2016/030008
§ 371 (c)(1),
(2) Date: Oct. 27, 2017

(87) PCT Pub. No.: WO2016/178966
PCT Pub. Date: Nov. 10, 2016

(65) Prior Publication Data
US 2018/0118601 A1    May 3, 2018

Related U.S. Application Data

(60) Provisional application No. 62/155,701, filed on May 1, 2015.

(51) Int. Cl.
*C03B 17/06* (2006.01)
*C03B 17/02* (2006.01)

(52) U.S. Cl.
CPC ............ *C03B 17/067* (2013.01); *C03B 17/02* (2013.01); *C03B 17/064* (2013.01)

(58) Field of Classification Search
CPC .................................................. C03B 17/067
See application file for complete search history.

(56) References Cited

U.S. PATENT DOCUMENTS 2,960,800 A * 11/1960 Atkeson .................. C03B 15/08
65/203
3,102,205 A * 8/1963 Combs .................... H02K 35/02
290/1 R (Continued)

FOREIGN PATENT DOCUMENTS

BE    436092 A  *  9/1939
CN    1564788 A     1/2005

(Continued)

OTHER PUBLICATIONS

EPO machine translation of BE436092A (1939), downloaded Jan. 27, 2022, pp. 1-4. (Year: 2022).*

(Continued)

*Primary Examiner* — Jodi C Franklin
(74) *Attorney, Agent, or Firm* — Daniel J. Greenhalgh (57) ABSTRACT

A system includes an overflow distributor (200) including a weir (245, 247). The system further includes a thermal exchange unit positioned in proximity to the weir. The thermal exchange unit (300) includes a tubular focusing member (310) and a thermal member (330) disposed at least partially within a lumen of the focusing member. The focusing member extends distally beyond a distal end of the thermal member by a distance It. In an embodiment the thermal exchange unit comprises several focusing members and thermal members to control a thermal profile of a glass (Continued)

stream flowing over the weir, particularly of a portion of the glass stream in contact with the weir.

15 Claims, 8 Drawing Sheets

(56) References Cited

U.S. PATENT DOCUMENTS

| | | | |
|---|---|---|---|
| 3,338,696 A | | 8/1967 | Dockerty |
| 3,506,429 A | * | 4/1970 | Overman .............. C03B 17/064 65/203 |
| 3,560,181 A | | 2/1971 | De Lajarte et al. |
| 3,607,183 A | * | 9/1971 | Fiori .................... C03B 15/02 65/83 |
| 3,634,058 A | * | 1/1972 | Yunker ................. C03B 15/08 65/196 |
| 3,682,606 A | | 8/1972 | Anderson et al. |
| 3,682,609 A | | 8/1972 | Dockerty |
| 3,723,082 A | | 3/1973 | Knowles et al. |
| 3,737,294 A | | 6/1973 | Dumbaugh et al. |
| 3,746,526 A | | 7/1973 | Giffon |
| 3,849,097 A | | 11/1974 | Giffen et al. |
| 3,931,438 A | | 1/1976 | Beall et al. |
| 4,102,664 A | | 7/1978 | Dumbaugh, Jr. |
| 4,214,886 A | | 7/1980 | Shay et al. |
| 5,342,426 A | | 8/1994 | Dumbaugh, Jr. |
| 5,559,060 A | | 9/1996 | Dumbaugh, Jr. et al. |
| 7,201,965 B2 | | 4/2007 | Gulati et al. |
| 7,514,149 B2 | | 4/2009 | Bocko et al. |
| 8,007,913 B2 | | 8/2011 | Coppola et al. |
| 8,141,388 B2 | | 3/2012 | Burdette |
| 8,393,177 B2 | | 3/2013 | Boratav et al. |
| 8,397,536 B2 | | 3/2013 | Delia et al. |
| 8,646,291 B2 | | 2/2014 | Coppola et al. |
| 9,290,403 B2 | | 3/2016 | Anderson et al. |
| 9,790,119 B2 | | 10/2017 | Aniolek et al. |
| 2003/0029199 A1 | * | 2/2003 | Pitbladdo .............. C03B 17/067 65/195 |
| 2004/0154336 A1 | * | 8/2004 | Pitbladdo .............. C03B 17/064 65/195 |
| 2007/0068197 A1 | * | 3/2007 | Pitbladdo .............. C03B 17/067 65/324 |
| 2008/0282736 A1 | * | 11/2008 | Filippov ................ C03B 17/064 65/203 |
| 2009/0217705 A1 | | 9/2009 | Filippov et al. |
| 2011/0100057 A1 | * | 5/2011 | Gaylo ................... C03B 17/064 65/90 |
| 2011/0277504 A1 | * | 11/2011 | Pitbladdo .............. C03B 17/067 65/53 |
| 2011/0289969 A1 | * | 12/2011 | Delia ................... C03B 17/067 65/195 |
| 2012/0318020 A1 | * | 12/2012 | Delia ................... C03B 17/067 65/29.19 |
| 2013/0118206 A1 | * | 5/2013 | Maeda ................. C03B 17/067 65/194 |
| 2013/0133370 A1 | * | 5/2013 | Boratav ................ C03B 17/064 65/84 |
| 2013/0175558 A1 | * | 7/2013 | Orsley ................... C03C 3/247 257/98 |
| 2013/0221237 A1 | | 8/2013 | Logunov |
| 2013/0221238 A1 | | 8/2013 | Li et al. |
| 2013/0224465 A1 | * | 8/2013 | Langensiepen ....... C04B 35/447 428/220 |
| 2013/0312459 A1 | * | 11/2013 | Coppola ............... C03B 17/064 65/195 |
| 2013/0333420 A1 | * | 12/2013 | Goller .................. C03B 5/1675 65/135.1 |
| 2014/0151721 A1 | * | 6/2014 | Orsley ................. H01L 33/648 257/88 |
| 2014/0238077 A1 | * | 8/2014 | Anderson ............. C03B 17/067 65/29.11 |
| 2014/0318182 A1 | * | 10/2014 | Coppola ............... C03B 17/067 65/29.21 |
| 2016/0052818 A1 | * | 2/2016 | Golyatin .............. C03B 17/064 65/195 |
| 2017/0305777 A1 | * | 10/2017 | Black ................... C03B 17/064 |
| 2018/0118601 A1 | * | 5/2018 | Brown-Tsai .......... C03B 17/064 |
| 2019/0375668 A1 | * | 12/2019 | Bookbinder ........... C03C 3/083 |
| 2021/0269347 A1 | * | 9/2021 | Zimmer ............... C03B 17/067 |
| 2021/0355015 A1 | * | 11/2021 | Aburada .............. C03B 17/064 |
| 2021/0380457 A1 | * | 12/2021 | Agrawal .............. C03B 15/12 |

FOREIGN PATENT DOCUMENTS

| | | |
|---|---|---|
| CN | 101028964 A | 9/2007 |
| CN | 101012098 B | 6/2010 |
| CN | 102015558 A | 4/2011 |
| CN | 102311218 A | 1/2012 |
| CN | 102432159 A | 5/2012 |
| CN | 102849926 A | 1/2013 |
| CN | 204198580 U | 3/2015 |
| CN | 104478197 A | 4/2015 |
| GB | 1200401 | 7/1970 |
| JP | 2003131434 A | 5/2003 |
| WO | 2011150051 A2 | 12/2011 |
| WO | 2013054059 A1 | 4/2013 |
| WO | 2014179291 A1 | 11/2014 |
| WO | WO-2014179291 A1 * | 11/2014 ............ B32B 17/06 |

OTHER PUBLICATIONS

Chinese Patent Application No. 201680025337.5; English Translation of the Office Action dated Dec. 24, 2019; China Patent Office; 11 Pgs.

International Search Report and Written Opinion of the International Searching Authority; PCT/US2016/030008; dated Jul. 15, 2016; 19 Pages; European Patent Office.

* cited by examiner

METHOD AND APPARATUS FOR CONTROLLING THICKNESS OF GLASS SHEET

This application claims the benefit of priority to International Application No. PCT/US2016/030008, filed on Apr. 29, 2016, which claims the benefit of priority to U.S. Application No. 62/155,701, filed on May 1, 2015, the content of each of which is incorporated herein by reference in its entirety.

BACKGROUND

1. Field

This disclosure relates to glass sheets, and more particularly to apparatuses and methods for controlling the thickness of glass sheets during formation thereof.

2. Technical Background

A glass sheet can be formed using a variety of different processes. The glass sheet can be severed to separate a glass pane therefrom. The glass pane can be processed further (e.g., during a cutting or molding process) to form a glass article.

SUMMARY

Disclosed herein are methods and apparatuses for controlling the thickness of a glass sheet.

Disclosed herein is a system comprising an overflow distributor comprising a weir. The system further comprises a thermal exchange unit positioned in proximity to the weir. The thermal exchange unit comprises a tubular focusing member and a thermal member disposed at least partially within a lumen of the focusing member. The focusing member extends distally beyond a distal end of the thermal member by a distance $l_f$.

Also disclosed herein is a method comprising flowing a molten glass stream over a weir. A thermal profile across a width of the molten glass stream flowing over the weir is controlled by exchanging heat with each of a plurality of regions of the molten glass stream.

Also disclosed herein is an apparatus comprising a tubular focusing member comprising a proximal end, an open distal end opposite the proximal end, and a lumen extending longitudinally within the focusing member. The apparatus further comprises a thermal member disposed at least partially within the lumen of the focusing member. The focusing member extends distally beyond the thermal member by a distance $l_f$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion" refers to the average coefficient of thermal expansion of a given material or layer between 0° C. and 300° C. As used herein, the term "coefficient of thermal expansion" refers to the average coefficient of thermal expansion unless otherwise indicated.

In various embodiments, a glass sheet comprises at least a first layer and a second layer. For example, the first layer comprises a core layer, and the second layer comprises one or more cladding layers adjacent to the core layer. The first layer and/or the second layer are glass layers comprising a glass, a glass-ceramic, or a combination thereof. In some embodiments, the first layer and/or the second layer are transparent glass layers.

In various embodiments, a thermal exchange unit can be used to heat or cool a region of a molten glass stream. For example, the thermal exchange unit comprises a thermal member configured to exchange heat with the molten glass stream and a focusing member configured to focus the exchange of heat on a region of the molten glass stream. A plurality of thermal exchange units can be positioned along a width of the molten glass stream to control a thermal profile across the width of the molten glass stream. The thickness of a glass sheet formed by the molten glass stream can be controlled by controlling the thermal profile across the width of the molten glass stream.

Figure 1:
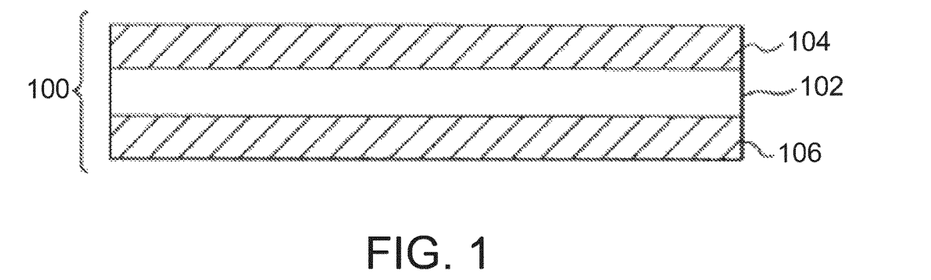
FIG. 1 is a cross-sectional view of one exemplary embodiment of a glass sheet.

FIG. 1 is a cross-sectional view of one exemplary embodiment of a glass sheet 100. In some embodiments, glass sheet 100 comprises a laminated sheet comprising a plurality of glass layers. The laminated sheet can be substantially planar as shown in FIG. 1 or non-planar. Glass sheet 100 comprises a core layer 102 disposed between a first cladding layer 104 and a second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass sheet comprises one or more intermediate layers disposed between the core layer and the first cladding layer and/or between the core layer and the second cladding layer. For example, the intermediate layers comprise intermediate glass layers and/or diffusions layers formed at the interface of the core layer and the cladding layer (e.g., by diffusion of one or more components of the core and cladding layers into the diffusion layer). In some embodiments, glass sheet 100 comprises a glass-glass laminate in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

In some embodiments, glass sheet 100 comprises a thickness of at least about 0.05 mm, at least about 0.1 mm, at least about 0.2 mm, or at least about 0.3 mm. Additionally, or alternatively, glass sheet 100 comprises a thickness of at most about 3 mm, at most about 2 mm, at most about 1.5 mm, at most about 1 mm, at most about 0.7 mm, or at most about 0.5 mm. In some embodiments, a ratio of a thickness of core layer 102 to a thickness of glass sheet 100 is at least about 0.6, at least about 0.7, at least about 0.8, at least about 0.85, at least about 0.9, or at least about 0.95. In some embodiments, a thickness of the second layer (e.g., each of first cladding layer 104 and second cladding layer 106) is from about 0.01 mm to about 0.3 mm.

In some embodiments, glass sheet 100 is configured as a strengthened glass sheet. For example, in some embodiments, the second glass composition of the second layer (e.g., first and/or second cladding layers 104 and 106) comprises a different average coefficient of thermal expansion (CTE) than the first glass composition of the first layer (e.g., core layer 102). For example, first and second cladding layers 104 and 106 are formed from a glass composition having a lower average CTE than core layer 102. The CTE mismatch (i.e., the difference between the average CTE of first and second cladding layers 104 and 106 and the average CTE of core layer 102) results in formation of compressive stress in the cladding layers and tensile stress in the core layer upon cooling of glass sheet 100. In various embodiments, each of the first and second cladding layers, independently, can have a higher average CTE, a lower average CTE, or substantially the same average CTE as the core layer.

In some embodiments, the average CTE of the first layer (e.g., core layer 102) and the average CTE of the second layer (e.g., first and/or second cladding layers 104 and 106) differ by at least about $5\times10^{-7}$ $C.^{-1}$, at least about $15\times10^{-7}$ $C.^{-1}$, or at least about $25\times10^{-7}$ $C.^{-1}$. Additionally, or alternatively, the average CTE of the first layer and the average CTE of the second layer differ by at most about $55\times10^{-7}$ $C.^{-1}$, at most about $50\times10^{-7}$ $C.^{-1}$, at most about $40\times10^{-7}$ $C.^{-1}$, at most about $30\times10^{-7}$ $C.^{-1}$, at most about $20\times10^{-7}$ $C.^{-1}$, or at most about $10\times10^{-7}$ $C.^{-1}$. For example, in some embodiments, the average CTE of the first layer and the average CTE of the second layer differ by from about $5\times10^{-7}$ $C.^{-1}$ to about $30\times10^{-7}$ $C.^{-1}$ or from about $5\times10^{-7}$ $C.^{-1}$ to about $20\times10^{-7}$ $C.^{-1}$. In some embodiments, the second glass composition of the second layer comprises an average CTE of at most about $40\times10^{-7}$ $C.^{-1}$, or at most about $35\times10^{-7}$ $C.^{-1}$. Additionally, or alternatively, the second glass composition of the second layer comprises an average CTE of at least about $25\times10^{-7}$ $C.^{-1}$, or at least about $30\times10^{-7}$ $C.^{-1}$. Additionally, or alternatively, the first glass composition of the first layer comprises an average CTE of at least about $40\times10^{-7}$ $C.^{-1}$, at least about $50\times10^{-7}$ $C.^{-1}$, or at least about $55\times10^{-7}$ $C.^{-1}$. Additionally, or alternatively, the first glass composition of the first layer comprises an average CTE of at most about $90\times10^{-7}$ $C.^{-1}$, at most about $85\times10^{-7}$ $C.^{-1}$, at most about $80\times10^{-7}$ $C.^{-1}$, at most about $70\times10^{-7}$ $C.^{-1}$, or at most about $60\times10^{-7}$ $C.^{-1}$.

Figure 2:
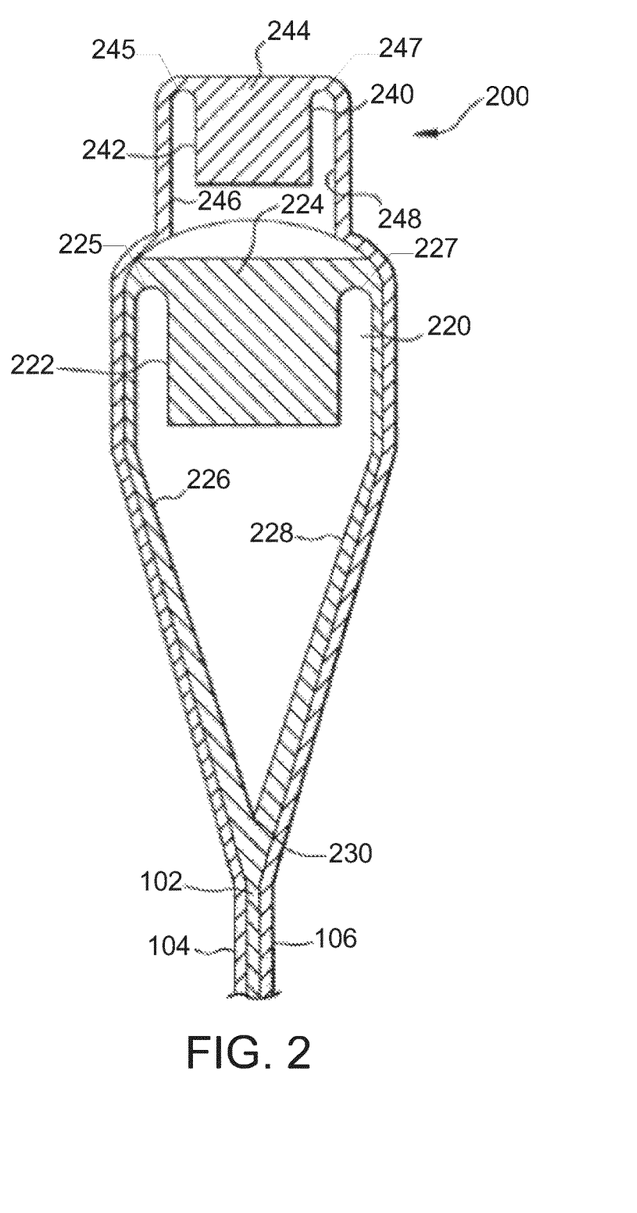
FIG. 2 is a cross-sectional view of one exemplary embodiment of a forming unit that can be used for forming the glass sheet of FIG. 1.

A glass sheet can be formed using a suitable process such as, for example, a fusion draw, down draw, slot draw, up draw, or float process. In some embodiments, a glass sheet is formed using a fusion draw process. FIG. 2 is a cross-sectional view of one exemplary embodiment of an overflow distributor 200 that can be used to form a glass sheet such as, for example, glass sheet 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms core layer 102 of glass sheet 100 as further described below. Upper overflow distributor 240 comprises a trough 242. A second glass composition 244 is melted and fed into trough 242 in a viscous state. Second glass composition 244 forms first and second cladding layers 104 and 106 of glass sheet 100 as further described below.

First glass composition 224 flows over a first weir 225 of lower overflow distributor 220 (e.g., by overflowing trough 222) and flows down a first outer forming surface 226 of the lower overflow distributor. In some embodiments, first glass composition 224 flows over a second weir 227 opposite first weir 225 and flows down a second outer forming surface 228 opposite first outer forming surface 226. First and second outer forming surfaces 226 and 228 converge at a draw line 230. The separate streams of first glass composition 224 flowing down respective first and second outer forming surfaces 226 and 228 of lower overflow distributor 220 converge at draw line 230 where they are fused together to form core layer 102 of glass sheet 100.

Second glass composition 244 flows over a first weir 245 of upper overflow distributor 240 (e.g., by overflowing trough 242) and flows down a first outer forming surface 246 of the upper overflow distributor. In some embodiments, second glass composition 244 flows over a second weir 247 opposite first weir 245 and flows down a second outer forming surface 248 opposite first outer forming surface 246. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass sheet 100.

In some embodiments, first glass composition 224 of core layer 102 in the viscous state is contacted with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or a pulling unit (e.g., pulling rollers, pulling belts, or a combination thereof). The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass sheet 100 comprises the laminated sheet as shown in FIG. 1. In other embodiments, the laminated sheet can be processed further (e.g., by cutting or molding) to form glass sheet 100.

Although glass sheet 100 shown in FIG. 1 comprises three layers, other embodiments are included in this disclosure. In other embodiments, a glass sheet can comprise a determined number of layers, such as one, two, four, or more layers. For example, a glass sheet comprising one layer can be formed using a single overflow distributor. A glass sheet comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass sheet comprising four or more layers can be formed using additional overflow distributors and/or using overflow distributors with divided troughs. Thus, a glass sheet having a determined number of layers can be formed by modifying the overflow distributor accordingly.

Although overflow distributor 200 shown in FIG. 2 comprises two overflow distributors, other embodiments are included in this disclosure. In other embodiments, an overflow distributor can comprise a determined number of overflow distributors, such as one, three, or more.

Although the overflow distributors shown in FIG. 2 comprise two opposing weirs, other embodiments are included in this disclosure. In other embodiments, at least one overflow distributor comprises a single weir. For example, at least one overflow distributor comprises a single-sided overflow distributor such that the molten glass composition flows over one weir and down one outer forming surface without also flowing over another opposing weir and down another opposing outer forming surface.

Figure 3:
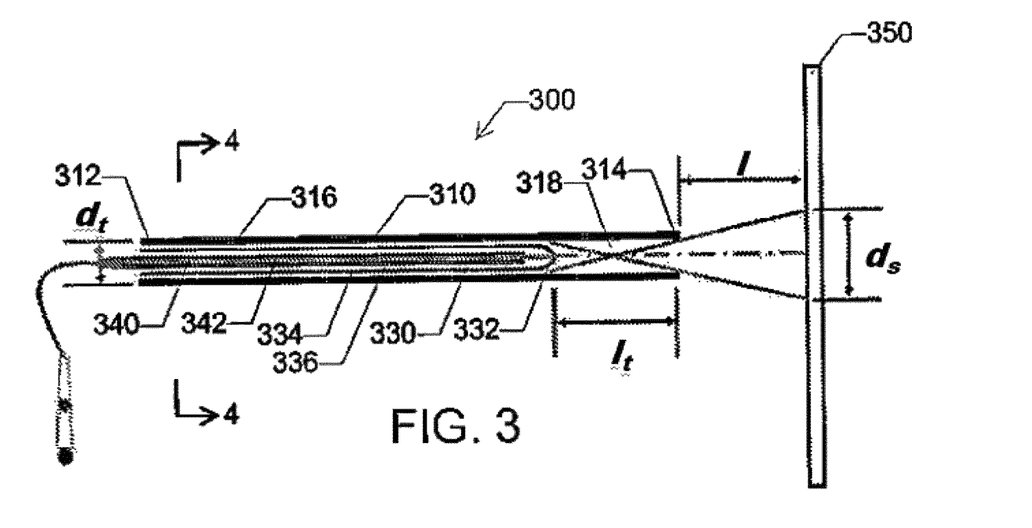
FIG. 3 is a longitudinal cross-sectional view of one exemplary embodiment of a thermal exchange unit.
Figure 4:
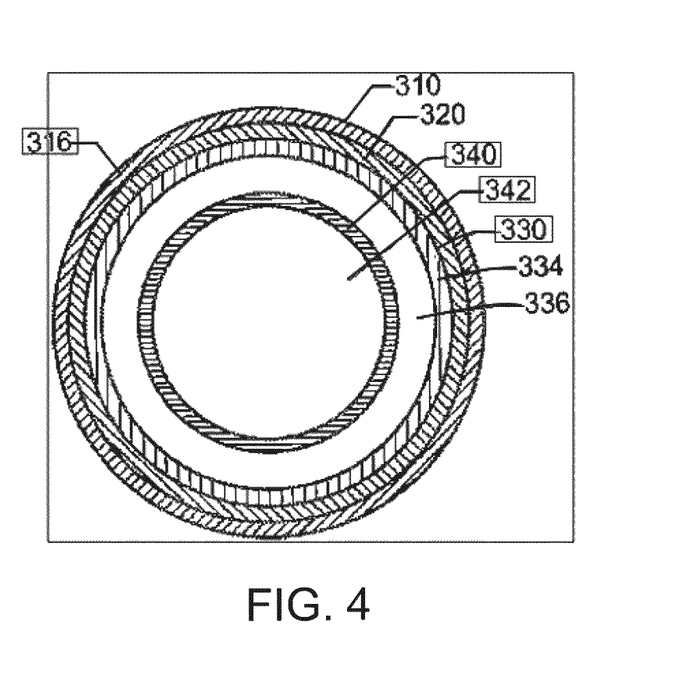
FIG. 4 is a transverse cross-sectional view taken along line 4-4 of FIG. 3.

FIG. 3 is a longitudinal cross-sectional view of one exemplary embodiment of a thermal exchange unit 300, and FIG. 4 is a transverse cross-sectional view of the thermal exchange unit taken along line 4-4 of FIG. 3. Thermal exchange unit 300 can be used to heat or cool a region of a molten glass stream. For example, thermal exchange unit 300 can be used to heat or cool a region of the molten glass stream flowing over a weir of an overflow distributor as described herein. In some embodiments, thermal exchange unit 300 comprises a focusing member 310 and a thermal member 330. Thermal member 330 is configured to exchange heat with a target such as, for example, a molten glass stream. Thermal member 330 can be heated to a temperature above the temperature of the target to heat the target or cooled to a temperature below the temperature of the target to cool the target. Focusing member 310 is configured to focus the exchange of heat on a region of the target.

In some embodiments, focusing member 310 comprises a tubular member comprising a proximal end 312, a distal end 314 opposite the proximal end, an outer wall 316, and a lumen 318 extending longitudinally within the focusing member. In the embodiment shown in FIG. 3, distal end 314 comprises an open distal end. The open distal end can aid in focusing thermal exchange unit 300 on a region of the target as described herein. In some embodiments, focusing member 310 comprises an insulation layer 320. Insulation layer 320 can be disposed on an inner surface of outer wall 316 as shown in FIGS. 3-4 or an outer surface of the outer wall. Insulation layer 320 can aid in reducing the rate of heat transfer between thermal member 330 and focusing member 310 and/or the environment surrounding thermal exchange unit 300. Insulation layer 320 can comprise a suitable insulating material including, for example, a refractory material. In other embodiments, insulation layer 320 is omitted. In some of such embodiments, the outer wall of the focusing member comprises an insulating material.

In some embodiments, focusing member 310 comprises a circular transverse cross-sectional shape as shown in FIGS. 3-4. In other embodiments, the focusing member can comprise another suitable transverse cross-sectional shape including, for example, elliptical, triangular, rectangular, or another polygonal or non-polygonal shape. A shape of a region of the target on which thermal exchange unit 300 is focused can depend on the transverse cross-sectional shape of the focusing member as described herein. In some embodiments, focusing member 310 comprises a substantially straight tube as shown in FIGS. 3-4. In other embodiments, the focusing member can comprise one or more bends. For example, the focusing member can comprise two substantially straight segments joined by an angled segment or bend having an obtuse angle. Such a bent tube configuration can enable the region of the target on with the focusing member is focused to be modified (e.g., by rotating the focusing member). Focusing member 310 comprises an inner dimension (e.g., an inner diameter) $d_r$.

In some embodiments, thermal member 330 is disposed at least partially within lumen 318 of focusing member 310. For example, a distal end 332 of thermal member 330 is disposed within lumen 318 of focusing member 310 as shown in FIG. 3. In other embodiments, the thermal member is disposed external of lumen 318 (e.g., adjacent to proximal end 312 of focusing member 310). Distal end 332 of thermal member 330 is disposed proximal of distal end 314 of focusing member 310. Thus, focusing member 310 extends distally beyond distal end 332 of thermal member 330 by a distance $l_t$ as shown in FIG. 3. Such extension of focusing member 330 can aid in focusing thermal exchange unit 300 on the region of the target.

In some embodiments, thermal member 330 comprises a tubular sheath 334 comprising a lumen 336 extending longitudinally within the sheath as shown in FIGS. 3-4. Sheath 334 can comprise a suitable transverse cross-sectional shape as described herein with reference to focusing member 310. In some embodiments, the transverse cross-sectional shape of sheath 334 is substantially the same as the transverse cross-sectional shape of focusing member 310. In other embodiments, the sheath comprises a different transverse cross-sectional shape than the focusing member. An outer dimension (e.g., an outer diameter) of sheath 334 is less than inner dimension $d_t$ of focusing member 310. Thus, sheath 334 can be disposed within focusing member 310 as described herein. A thermal exchange fluid can flow through lumen 336 to heat or cool sheath 334. For example, the thermal exchange fluid flows through lumen 336 to heat or cool distal end 332 of sheath 334. The thermal exchange fluid can comprise a suitable gas or liquid including, for example, air, helium, nitrogen, water, an oil, an alcohol, a glycol, or combinations thereof. In some embodiments, distal end 332 of sheath 334 comprises a closed distal end. The closed distal end can prevent the thermal exchange fluid from exiting sheath 334 in a direction toward the target. For example, the closed distal end can prevent the thermal exchange fluid from exiting sheath 334 in a direction toward the molten glass stream.

Although sheath 334 is described as a tubular sheath that is distinct from and disposed within focusing member 310, other embodiments are included in this disclosure. For example, in other embodiments, a portion of the focusing member serves as the sheath. In such embodiments, a plug disposed within the focusing member can serve as the distal end of the sheath. Thus, the thermal exchange fluid can flow within the focusing member to heat or cool the plug.

In some embodiments, thermal member 330 comprises an inner tube 340 configured to supply the thermal exchange fluid to sheath 334 or withdraw the thermal exchange fluid from the sheath. Inner tube 340 comprises a lumen 342 extending longitudinally within the inner tube. In some embodiments, inner tube 340 is disposed at least partially within sheath 334. For example, a distal end of inner tube 340 is disposed within lumen 336 of sheath 334 proximal of distal end 332 of the sheath as shown in FIG. 3. In some embodiments, an outer dimension (e.g., an outer diameter) of inner tube 340 is less than an inner dimension (e.g., an inner diameter) of sheath 334 as shown in FIGS. 3-4 so that the inner tube can be introduced into lumen 336 of the sheath. A space is defined between an outer surface of inner tube 340 and an inner surface of sheath 334. Inner tube 340 can comprise a suitable transverse cross-sectional shape as described herein with reference to focusing member 310 and sheath 334. In some embodiments, the thermal exchange fluid flows distally through lumen 342 of inner tube 340, exits the distal end of the inner tube, and flows proximally through the space between the inner tube and sheath 334. In other embodiments, the thermal exchange fluid flows distally through the space between inner tube 340 and sheath 334, enters the distal end of the inner tube, and flows proximally through lumen 342 of the inner tube. The thermal exchange fluid flowing through sheath 334 can heat or cool the sheath to aid in transferring heat to or from the target as described herein.

In some embodiments, the transverse cross-sectional shape of inner tube 340 is substantially the same as the transverse cross-sectional shape of sheath 334. Thus, the space between inner tube 340 and sheath 334 comprises an annular space. In other embodiments, the inner tube comprises a different transverse cross-sectional shape than the sheath. For example, the transverse cross-sectional shape of the inner tube comprises a polygon having a determined number of vertices (e.g., a triangle having three vertices, a rectangle having four vertices, a pentagon having five vertices, etc.). The inner tube can be introduced into the lumen of the sheath such that the vertices are in contact with the inner surface of the sheath. Thus, the space between the inner tube and the sheath comprises a series of channels formed between the edges of the inner tube and the inner surface of the sheath.

Although thermal member 330 is described herein as comprising sheath 334 and inner tube 340 to supply the thermal exchange fluid to the sheath or withdraw the thermal exchange fluid from the sheath, other embodiments are included in this disclosure. In other embodiments, thermal member 330 can comprise a suitable heating and/or cooling element such as, for example, an induction heater, a resistive heater, a torch, a thermoelectric heat pump (e.g., a thermoelectric cooler), an air jet, or combinations thereof.

In some embodiments, the thermal exchange unit is focused on a region of a target to exchange heat with the region of the target. For example, thermal exchange unit 300 is positioned in proximity to a target 350 as shown in FIG. 3 to exchange heat with the target. In some embodiments, target 350 comprises a weir or a molten glass stream (e.g., a molten glass stream flowing over a weir) as described herein. In other embodiments, target 350 comprises a glass sheet (e.g., a glass ribbon traveling away from an overflow distributor). Thermal exchange unit 300 is focused on a region (e.g., a focused region) of target 350. For example, focusing member 310 extends distally beyond distal end 332 of thermal member 330. Such extension of focusing member 310 reduces the portion of target 350 that has a view to thermal member 330. In other words, focusing member 310 narrows the field of view of thermal member 330 and limits the ability of the thermal member to exchange heat with a remote region of target 350 disposed outside of the limited field of view. Thus, thermal exchange unit 300 is positioned to exchange heat with the focused region of target 350 without substantially exchanging heat with a remote region of the target spaced away from the focused region.

The size and shape of the focused region depends on the geometry and arrangement of focusing member 310 and thermal member 330 relative to one another and to target 350. In the embodiment shown in FIG. 3, focusing member 310 comprises a substantially cylindrical tube with inner diameter $d_f$, the focusing member extends distally beyond distal end 332 of thermal member 330 by distance $l_f$, and distal end 314 of the focusing member is spaced from target 350 by a distance l. The focused region of target 350 comprises a shape that is substantially the same as the transverse cross-sectional shape of focusing member 310 and a dimension (e.g., a diameter) $d_s$ that is given by equation (1).

$$d_s = 2\frac{d_t}{l_t} \cdot l + d_t \quad (1)$$

Thus, thermal exchange unit 300 can be configured to achieve a focused region with a desired size and shape. For example, dimension $d_s$ of the focused region can be reduced by positioning thermal member 330 farther proximally within focusing member 310 to increase distance $l_t$, by positioning the focusing member closer to target 350 to decrease distance l, and/or by reducing diameter $d_t$ of the focusing member. Conversely, dimension $d_s$ of the determined region can be increased by positioning thermal member 330 farther distally within focusing member 310 to decrease distance $l_t$, by positioning the focusing member farther from target 350 to increase distance l, and/or by increasing diameter $d_t$ of the focusing member. In some embodiments, distance $l_t$ and/or distance l are adjusted to achieve a region having a desired size. In some embodiments, dimension $d_s$ of the focused region is between about 2 cm and about 13 cm. Additionally, or alternatively, dimension $d_t$ of focusing member 310 is between about 1 cm and about 3 cm. Additionally, or alternatively, distance $l_t$ is between about 1 cm and about 20 cm. Additionally, or alternatively, distance l is between about 2 cm and about 6 cm.

Figure 5:
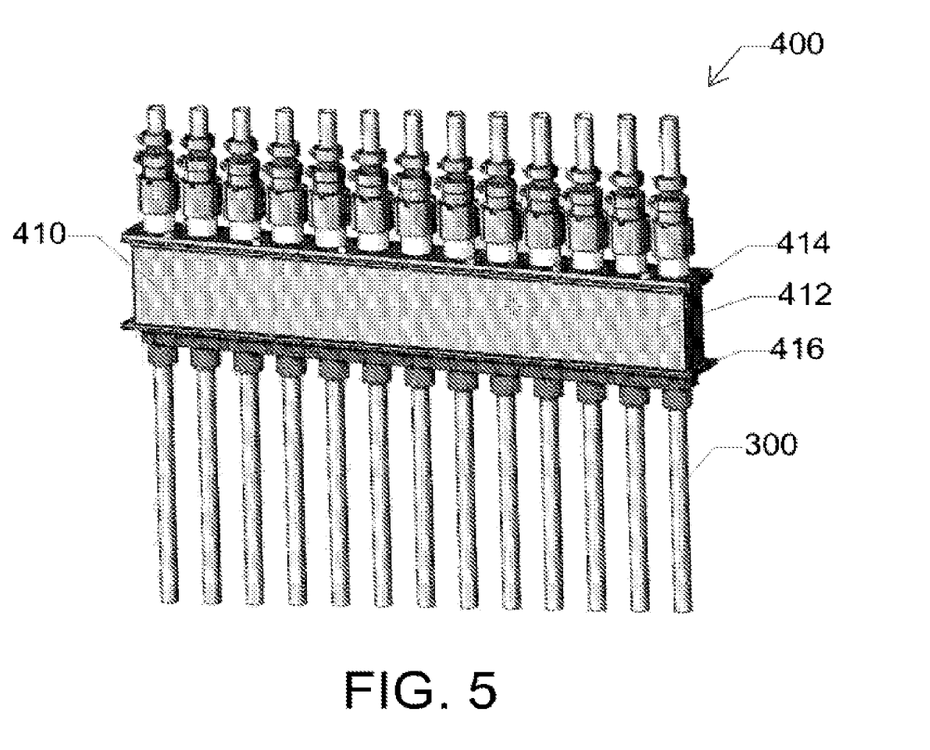
FIG. 5 is a perspective view of one exemplary embodiment of a thermal exchange array.

FIG. 5 is a perspective view of one embodiment of a thermal exchange array 400 comprising a plurality of thermal exchange units 300, each configured as described herein with reference to FIGS. 3-4. Each of the plurality of thermal exchange units 300 is mounted in a housing 410 of thermal exchange array 400. In some embodiments, housing 410 comprises a housing body 412. Additionally, or alternatively, housing 410 comprises a first plate 414 coupled to a first surface of housing body 412 and/or a second plate 416 coupled to a second surface of the housing body opposite the first surface.

Housing 410 comprises an opening extending therethrough. For example, housing 410 comprises a plurality of openings each extending through housing body 412 between the first surface and the second surface thereof and configured to receive a corresponding thermal exchange unit 300 as shown in FIG. 5. In some embodiments, one or more of the plurality of openings comprises a size and shape corresponding to an outer surface of thermal exchange unit 300 (e.g., an outer surface of focusing member 310). Thus, thermal exchange unit 300 can be introduced into the opening to mount the thermal exchange unit in housing 410 and maintain the thermal exchange unit in position relative to the housing. In other embodiments, one or more of the plurality of openings comprises an elongate slot comprising at least one dimension that is larger than the outer surface of thermal exchange unit 300. Such a slotted opening can enable thermal exchange unit 300 to be repositioned within the opening (e.g., by sliding the thermal exchange unit within the elongate slot). Housing 410 can be positioned above a weir of an overflow distributor such that thermal exchange units 300 mounted in the housing are focused on the weir as described herein.

Figure 6:
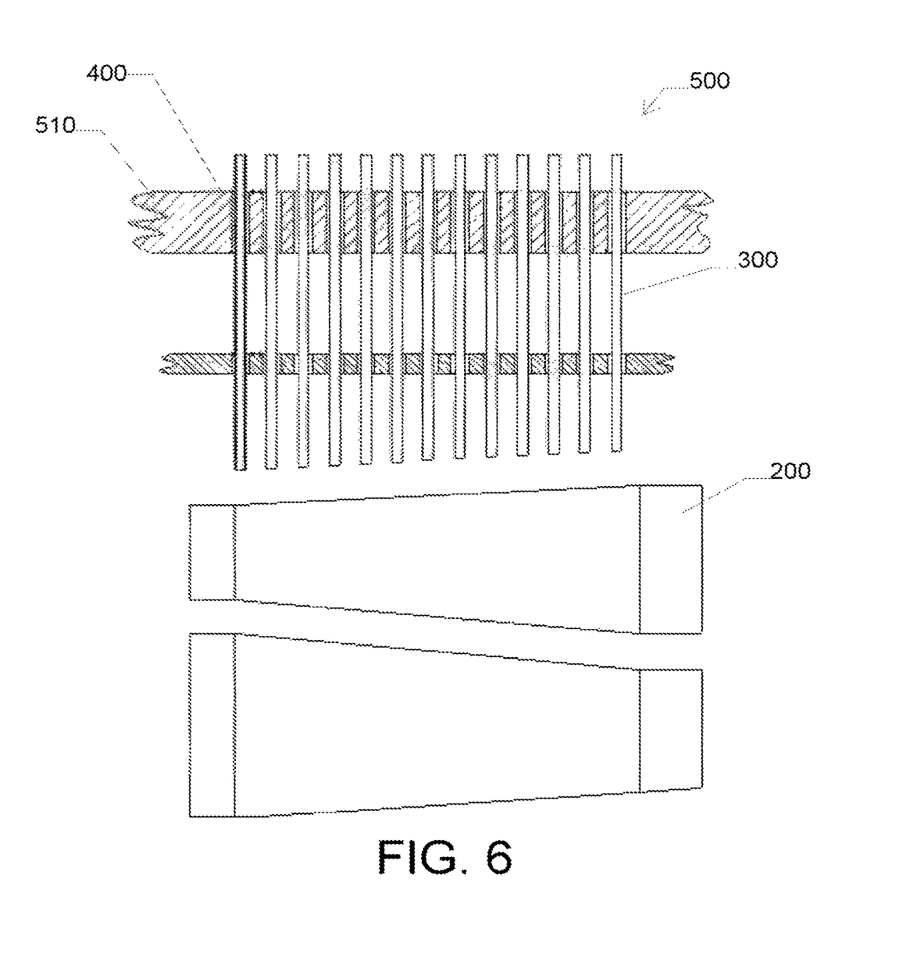
FIG. 6 is a partial schematic side view of one exemplary embodiment of a glass sheet forming system.
Figure 7:
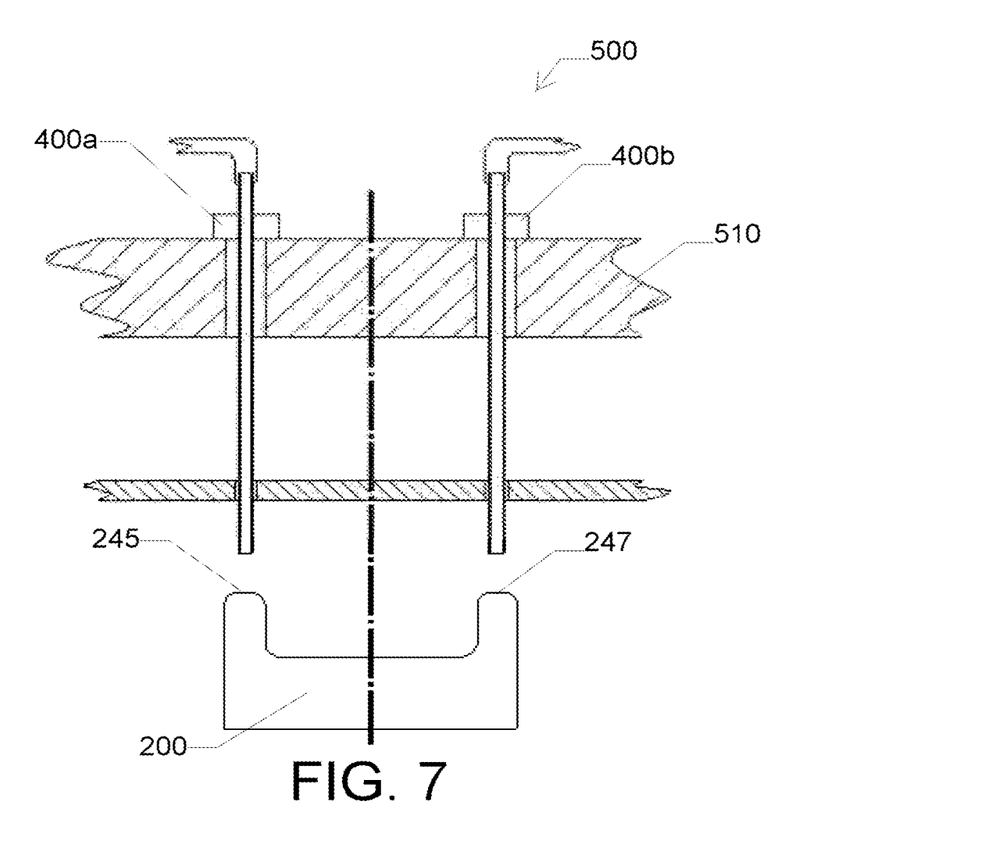
FIG. 7 is a partial schematic end view of the glass sheet forming system of FIG. 6.

In various embodiments, a glass sheet forming system comprises a weir (e.g., a weir of an overflow distributor) and one or more thermal exchange units positioned in proximity to the weir. For example, the glass sheet forming system comprises an overflow distributor and a thermal exchange array positioned in proximity to a weir of the overflow distributor. The thermal exchange array can be used to control a thermal profile of a molten glass stream flowing over the weir of the overflow distributor as described herein. FIGS. 6 and 7 are schematic side and end views, respectively, of one exemplary embodiment of a glass sheet forming system 500 comprising overflow distributor 200 described herein with reference to FIG. 2 and thermal exchange array 400 described herein with reference to FIG. 5. In the embodiment shown in FIGS. 6-7, thermal exchange array 400 is disposed above a weir of upper overflow distributor 240. Thermal exchange units 300 of thermal exchange array 400 are arranged such that each thermal exchange unit is focused on a corresponding region (e.g., a focused region) of the weir. For example, thermal exchange units 300 are arranged in a substantially linear pattern extending in a transverse direction along the width of the weir. Thus, the regions corresponding to thermal exchange units 300 are arranged in a substantially linear pattern extending in the transverse direction along the width of the weir. The transverse direction extends substantially perpendicular to a thickness of the weir.

Distal end 314 of focusing member 310 of each thermal exchange unit 300 is spaced from the weir by distance l. In some embodiments, distance l is substantially the same for each of the plurality of thermal exchange units 300 of thermal exchange array 400 as shown in FIGS. 6-7. For example, the weir is disposed at an angle to the horizontal, and thermal exchange units 300 are staggered such that a line passing through distal end 314 of each focusing member 310 is substantially parallel to the weir as shown in FIGS. 6-7. In other embodiments, distance l is different for different thermal exchange units of the thermal exchange array. Each thermal exchange unit 300 is focused on a region of the weir. In some embodiments, each thermal exchange unit 300 is spaced from an adjacent thermal exchange unit by a suitable distance such that the regions on which the thermal exchange units are focused are disposed adjacent to one another and/or are non-overlapping. For example, adjacent thermal exchange units 300 are spaced from one another by a distance of at least $d_s$ so that the corresponding adjacent regions do not overlap one another. Thus, each thermal exchange unit 300 is configured to exchange heat with the corresponding region without substantially exchanging heat with the adjacent region. In other embodiments, adjacent thermal exchange units are spaced from one another by a suitable distance such that the regions on which the thermal exchange units are focused at least partially overlap. In some embodiments, adjacent thermal exchange units 300 are spaced from one another by a suitable distance such that a frequency or wavelength of the thickness variation of the glass sheet formed by the molten glass stream is smaller than dimension $d_t$ of focusing member 310.

In some embodiments, one or more of the plurality of thermal exchange units 300 of thermal exchange array 400 is removably mounted in housing 410. One or more of the plurality of thermal exchange units 300 can be removed from housing 410 leaving a vacant opening in the housing. A portion of the weir disposed beneath the vacant opening is free of a thermal exchange unit 300 focused thereon. Thus, one or more of the plurality of thermal exchange units 300 can be selectively removed to modify a thermal exchange pattern of thermal exchange array 400 along the width of the weir. In some embodiments, thermal exchange array 400 comprises one or more plugs that are removably mounted in vacant openings of housing 410. The plugs can aid in maintaining the thermal insulating properties of housing 410 with one or more thermal exchange units 300 removed therefrom. For example, the plugs comprise an insulating material that substantially fills the vacant openings.

In some embodiments, thermal exchange array 400 comprises a first thermal exchange array 400a and a second thermal exchange array 400b. Each thermal exchange array can be disposed in proximity to a weir of upper overflow distributor 240. For example, first thermal exchange array 400a is disposed above first weir 245 and/or second thermal exchange array 400b is disposed above second weir 247 as shown in FIG. 7. Thus, first thermal exchange array 400a can be used to control a thermal profile of a molten glass stream flowing over first weir 245 and/or second thermal exchange array 400b can be used to control a thermal profile of a molten glass stream flowing over second weir 247.

In some embodiments, overflow distributor 200 is at least partially surrounded by an enclosure 510. Enclosure 510 can be insulated to aid in maintaining a temperature of the environment surrounding overflow distributor 200. In some embodiments, thermal exchange array 400 is mounted to enclosure 510. For example, enclosure 510 comprises an opening, and thermal exchange array 400 is received within the opening of the enclosure. In some embodiments, housing 410 comprises an insulating material to maintain the integrity of enclosure 510. For example, housing body 412 comprises a refractory material.

Molten glass flows over the weir of the overflow distributor. For example, second glass composition 244 flows over first weir 245 and/or second weir 247 of upper overflow distributor 240 as described herein with reference to FIG. 2. Thermal exchange unit 300 is disposed in proximity to the weir. For example, thermal exchange array 400a is disposed above first weir 245 and/or thermal exchange array 400b is disposed above second weir 247 as described herein with reference to FIGS. 6-7. A thermal profile across a width of the molten glass stream (i.e., the temperatures of determined regions at various transverse locations along the width of the molten glass stream) flowing over the weir is controlled. For example, the thermal profile of a portion of the molten glass stream in contact with the weir (e.g., an upper surface of the weir) is controlled. In some embodiments, each of the plurality of thermal exchange units 300 of thermal exchange array 400 is focused on a corresponding region of the molten glass stream flowing over the weir. The regions are distributed along the width of the molten glass stream flowing over the weir. For example, each region of the molten glass stream flows over a corresponding region of the weir. In some embodiments, each of the plurality of thermal exchange units 300 independently exchanges heat with the corresponding region of the molten glass stream. Thus, different regions along the width of the molten glass stream are independently heated or cooled by the corresponding thermal exchange unit 300. Such independent heating or cooling of the regions of the molten glass stream can enable the temperature of the molten glass stream to be varied across the width of the molten glass stream. Thus, the thermal profile across the width of the molten glass stream flowing over the weir is controlled with the plurality of thermal exchange units 300.

Figure 8:
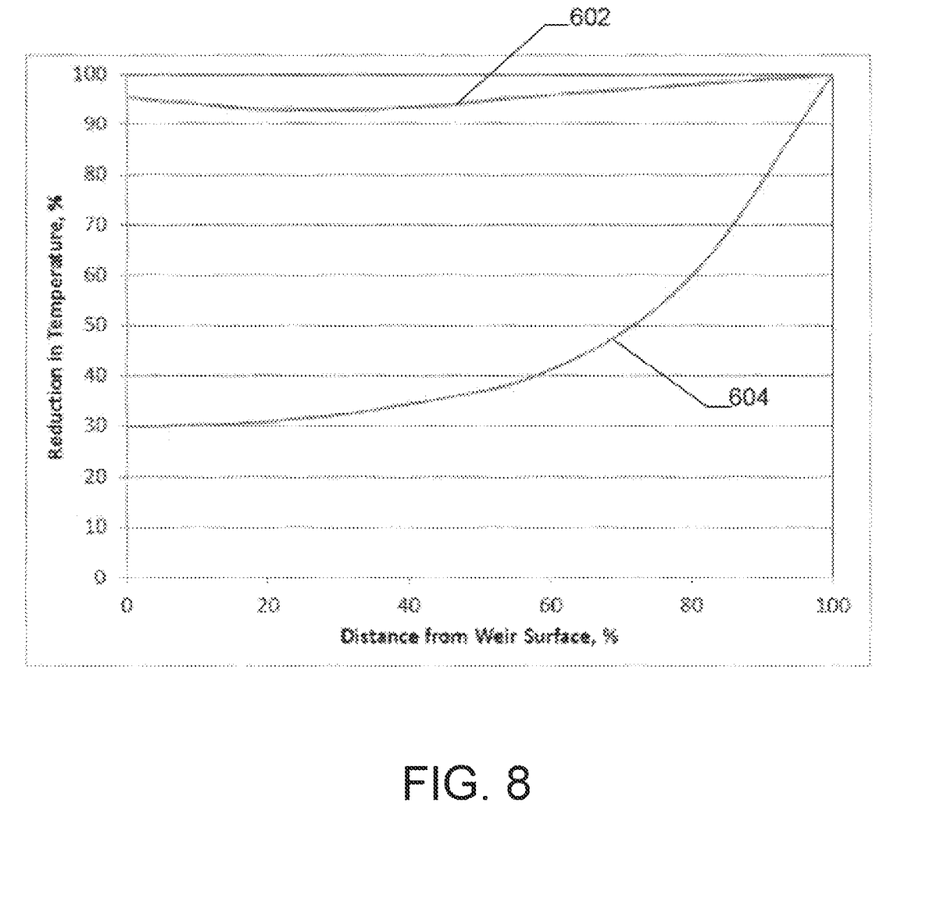
FIG. 8 is a graphical illustration of modeling data comparing radiative and convective cooling of a region of a molten glass stream flowing over a weir.

Thermal exchange unit 300 can exchange heat with the molten glass stream by a suitable heat exchange mechanism including, for example, radiation, convection, or a combination thereof. In some embodiments, thermal exchange unit 300 exchanges heat with the molten glass stream by radiation. In other words, thermal exchange unit 300 exchanges heat with the molten glass stream by emitting or absorbing energy in the form of electromagnetic radiation. FIG. 8 is a graphical illustration of modeling data comparing radiative and convective cooling of a region of a molten glass stream flowing over a weir. On the x-axis, 0% is the surface of the molten glass stream closest to the weir, and 100% is the surface of the molten glass stream farthest from the weir. Curve 602 represents radiative cooling. Curve 604 represents convective cooling. Thus, FIG. 8 illustrates that radiative cooling cools the molten glass stream substantially uniformly throughout the thickness of the molten glass stream, while convective cooling cools the molten glass stream more at the surface farthest from the weir and less at the surface closest to the weir. In other words, radiative heat transfer can act throughout the thickness of the molten glass stream. Thermal member 330 is heated or cooled and exchanges heat with the molten glass stream by radiative heat transfer to heat or cool the corresponding region of the molten glass stream. In some embodiments, the thermal exchange fluid flows within sheath 334 to heat or cool distal end 332 of the sheath. Sheath 334 exchanges heat with the region of the molten glass stream by radiative heat transfer between heated or cooled distal end 332 and the molten glass stream. In some embodiments, sheath 334 (e.g., distal end 332 of the sheath) comprises a material with a relatively high emissivity such as, for example, silicon carbide. Such a material can enhance the heat transfer between sheath 334 and the molten glass stream.

In some embodiments, distal end 332 comprises a closed distal end as described herein such that the thermal exchange fluid is prevented from exiting sheath 334 and flowing out of thermal exchange unit 300 toward the molten glass stream. Contacting the molten glass stream with the thermal exchange fluid (e.g., blowing air on the molten glass stream) can create ripples and/or introduce debris into the molten glass stream. Thus, avoiding contact between the thermal exchange fluid and the molten glass stream (e.g., by preventing the thermal exchange fluid from exiting thermal exchange unit 300 toward the molten glass stream) can help to avoid disturbing the molten glass stream. Additionally, or alternatively, discharging fluid out of thermal exchange unit 300 toward the molten glass stream can cause temperature gradients in the environment surrounding the molten glass stream. Thus, avoiding discharging fluid out of thermal exchange unit 300 toward the molten glass stream can help to focus the heat transfer on the region. In other embodiments, the thermal exchange fluid flows out of the thermal exchange unit toward the molten glass stream. For example, air flows out of the thermal exchange unit and is directed toward the molten glass stream to heat or cool the region of the molten glass stream.

The thickness of the glass sheet formed by the molten glass stream can be controlled by controlling the thermal profile across the width of the molten glass stream flowing over the weir. For example, a region of the molten glass stream is heated or cooled by the corresponding thermal exchange unit 300. Heating the region causes a local decrease in viscosity of the molten glass stream at the region and, in turn, a local increase in the amount of molten glass flowing over the weir at the region. The local increase in the amount of molten glass flowing over the weir at the region causes an increase in the thickness of the corresponding region of the glass sheet. Conversely, cooling the region causes a local increase in viscosity of the molten glass stream at the region and, in turn, a local decrease in the amount of molten glass flowing over the weir at the region. The local decrease in the amount of molten glass flowing over the weir at the region causes a decrease in the thickness of the corresponding region of the glass sheet. Thus, the thicknesses of different regions of the glass sheet are independently controlled by the corresponding thermal exchange units 300. The temperature profile across the width of the molten glass stream flowing over the weir can be controlled to control the thickness profile across the width of the glass sheet (i.e., the thicknesses of different regions across the width of the glass sheet corresponding to regions at various transverse locations along the width of the molten glass stream). Such control can enable a substantially uniform thickness to be maintained across the width of the glass sheet. Alternatively, such control can enable precise thickness disuniformity across the width of the glass sheet. For example, longitudinal bands or discrete areas of the glass sheet can be relatively thicker or thinner than other portions of the glass sheet.

In some embodiments, the local temperatures of one or more of the regions of the molten glass stream are measured, and thermal array 400 is adjusted in response to the measured local temperatures. For example, individual thermal exchange units 300 corresponding to the regions at which local temperatures are measured are independently adjusted in response to the measured local temperatures. Thermal exchange unit 300 can be adjusted by a suitable method including, for example, adjusting the temperature of sheath 334 (e.g., by adjusting the flow rate and/or the temperature of the thermal exchange fluid flowing through the sheath), adjusting the position of thermal member 330 relative to focusing member 310, adjusting the position of the thermal exchange unit relative to the molten glass stream, or combinations thereof. Thus, the temperature profile of the molten glass stream is dynamically controlled by independently adjusting one or more thermal exchange units 300 in response to the measured temperature of the corresponding regions of the molten glass stream. The local temperatures can be measured using a suitable temperature sensor including, for example, a laser temperature sensor, an infrared temperature sensor, a thermocouple, a thermistor, a resistance temperature detector, or combinations thereof.

In some embodiments, the local thicknesses of different regions across the width of the glass sheet corresponding to the regions of the molten glass stream are monitored, and thermal array 400 is adjusted in response to the measured local thicknesses (e.g., by independently adjusting individual thermal exchange units 300 corresponding to the regions of the molten glass stream corresponding to the different regions of the glass sheet at which local thicknesses are measured). Thus, the thickness profile of the glass sheet is dynamically controlled by independently adjusting one or more thermal exchange units 300 in response to the measured thicknesses of the different regions of the glass sheet. The local thicknesses can be measured using a suitable distance measuring device including, for example, a laser distance sensor, an infrared distance sensor, an ultrasonic distance sensor, or combinations thereof.

Figure 9:
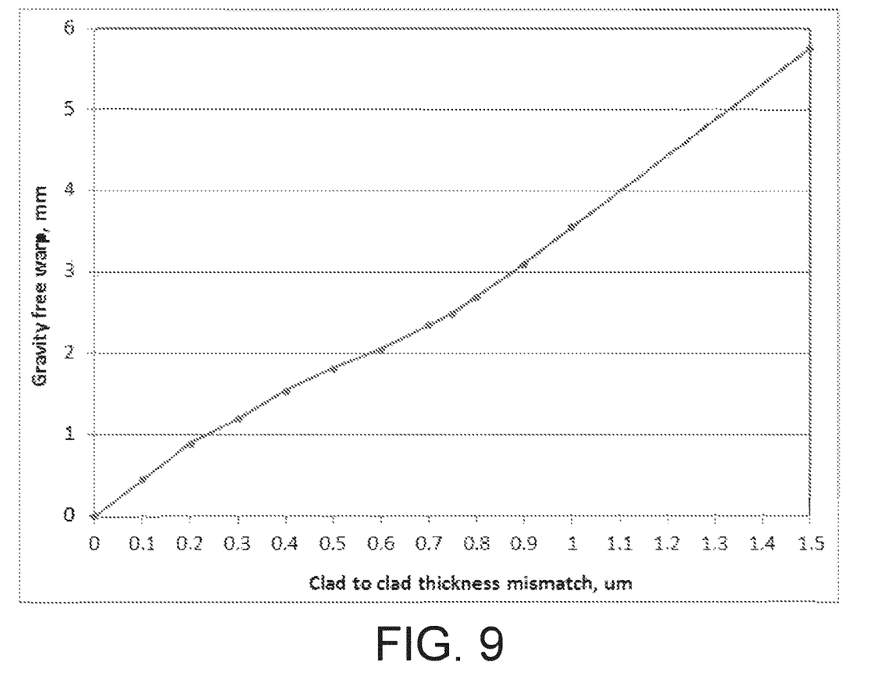
FIG. 9 is a graphical illustration of simulation results predicting the gravity free warp of one exemplary embodiment of a laminated glass sheet as a function of clad-to-clad thickness mismatch.

In some embodiments, glass sheet 100 comprises a laminated glass sheet as described herein. In such embodiments, thickness uniformity of the various layers generally is considered beneficial for process stability and product quality. For example, it can be beneficial for the thicknesses of first cladding layer 104 and second cladding layer 106 to be substantially equal. In other words, it can be beneficial for the clad-to-clad thickness mismatch to be low. Additionally, or alternatively, it can be beneficial for the thicknesses of first cladding layer 104 and second cladding layer 106 to be substantially uniform along the width and length of glass sheet 100. Such thickness uniformity can be especially beneficial in embodiments in which glass sheet 100 comprises a CTE mismatch as described herein. For example, FIG. 9 is a graphical illustration of simulation results predicting the gravity free warp of one exemplary embodiment of glass sheet 100 comprising a CTE mismatch as a function of clad-to-clad thickness mismatch. The gravity free warp can represent the maximum deviation of the glass sheet from planar when held in a vertical orientation. The data presented in FIG. 9 indicates that increasing clad-to-clad thickness mismatch causes a corresponding increase in gravity free warp. For example, a clad-to-clad thickness mismatch of only 0.5 μm can cause gravity free warp of about 2 mm. The temperature profiles of the molten glass streams flowing over the weirs of the overflow distributor can be controlled as described herein to reduce the clad-to-clad thickness mismatch, thereby reducing the gravity free warp of the glass sheet.

The temperature profile of each of the molten glass streams flowing over opposing weirs can be controlled independently of one another. For example, the temperature profile of the molten glass stream flowing over first weir 245 is controlled with first thermal exchange array 400a, and the temperature thickness profile of the molten glass stream flowing over second weir 247 is controlled with second thermal exchange array 400b. Such control can enable formation of a laminated glass sheet with clad layers of substantially equal thickness. Additionally, or alternatively, such control can enable formation of a laminated glass sheet with clad and/or core layers that are substantially uniform.

Although thermal exchange array 400 is described herein for controlling the temperature profile of a molten glass stream flowing over a weir, other embodiments are included in this disclosure. For example, in other embodiments, a thermal exchange array can be positioned adjacent to a glass ribbon (e.g., the glass ribbon traveling away from the draw line of an overflow distributor) to control the temperature and/or thickness profile across the width of the glass ribbon.

Although thermal exchange array 400 is described herein as being positioned in proximity to the weir of upper overflow distributor 240, other embodiments are included in this disclosure. For example, in other embodiments, a thermal exchange array can be positioned in proximity to a weir of the lower overflow distributor. In some of such embodiments, the upper overflow distributor can be omitted, which can enable formation of a single-layer glass sheet having a uniform thickness.

The glass sheets described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications.

It will be apparent to those skilled in the art that various modifications and variations can be made without departing from the spirit or scope of the invention. Accordingly, the invention is not to be restricted except in light of the attached claims and their equivalents.

What is claimed is:

1. A system comprising:
an overflow distributor comprising a weir; and
a thermal exchange unit positioned above the weir and comprising:
   a tubular member comprising a proximal end, an open distal end opposite the proximal end, and a lumen extending longitudinally within the tubular member; and
   a thermal member disposed at least partially within the lumen of the tubular member, the tubular member extending distally beyond a distal end of the thermal member by a distance $l_t$, wherein the thermal member comprises a material that is at least one of heated and cooled such that the material exchanges heat with the weir or a glass disposed thereon via radiative heat transfer through the open distal end of the tubular member, wherein the thermal member comprises:
      a sheath having a proximal end, a closed distal end, and a lumen extending longitudinally within the sheath, and
      an inner tube disposed at least partially within a lumen of the sheath, wherein an outer diameter of the inner tube is less than an inner diameter of the sheath such that a space is defined between an outer surface of the inner tube and an inner surface of the sheath, wherein when a thermal exchange fluid is introduced into and flows distally through a lumen of the inner tube, the thermal exchange fluid enters the space through an open distal end of the inner tube and then flows proximally through the space.

2. The system of claim 1, wherein a distal end of the tubular member is spaced from the weir by a distance l, wherein a size of a region of the weir that is subjected to the radiative heat transfer is dependent on the distance.

3. The system of claim 1, wherein the thermal exchange unit comprises a plurality of thermal exchange units each positioned in proximity to one of a plurality of regions of the weir.

4. The system of claim 3, wherein the thermal exchange units are arranged in a line extending at least partially along a width of the weir.

5. The system of claim 3, further comprising a housing comprising a plurality of openings extending through the housing, each of the plurality of thermal exchange units received within one of the plurality of openings of the housing.

6. The system of claim 1, wherein the overflow distributor is an upper overflow distributor, and the system further comprises a lower overflow distributor positioned below the upper overflow distributor.

7. The system of claim 1, wherein the tubular member is cylindrical.

8. The system of claim 1, wherein the distance $l_t$ is between 1 cm and 20 cm.

9. The system of claim 1, wherein the distance $l_t$ is between 2 cm and 6 cm.

10. An apparatus comprising:
a tubular member comprising a proximal end, an open distal end opposite the proximal end, and a lumen extending longitudinally within the tubular member; and
a thermal member disposed at least partially within the lumen of the tubular member, the tubular member extending distally beyond the thermal member by a distance $l_t$, wherein the thermal member comprises:
   a tubular sheath comprising a proximal end, a closed distal end, and a lumen extending longitudinally within the tubular sheath, the tubular sheath being disposed within the tubular member, wherein the closed distal end of the tubular sheath is constructed of a material that is at least one of heated and cooled to facilitate radiative heat transfer with a region of a target, wherein the region of the target that is subjected to the radiative heat transfer is dependent on the distance $l_t$ and the thermal member is positioned above the region of the target; and
   an inner tube disposed at least partially within the lumen of the tubular sheath, wherein an outer diameter of the inner tube is less than an inner diameter of the tubular sheath such that a space is defined between an outer surface of the inner tube and an inner surface of the tubular sheath, wherein when a thermal exchange fluid is introduced into and flows distally through a lumen of the inner tube, the thermal exchange fluid enters the space through an open distal end of the inner tube and then flows proximally through the space.

11. The apparatus of claim 10, wherein the thermal member comprises silicon carbide.

12. The apparatus of claim 10, wherein the tubular member further comprises an insulation layer configured to reduce heat transfer from the tubular member.

13. The apparatus of claim 10, wherein the tubular member comprises a plurality of tubular members, each of the plurality of tubular members comprising a lumen, the thermal member comprises a plurality of thermal members, and each thermal member is disposed at least partially within the lumen of a corresponding one of the plurality of tubular members.

14. The apparatus of claim 13, further comprising a housing comprising an opening, each of the plurality of tubular members disposed within the opening of the housing.

15. The apparatus of claim 14, wherein at least one of:
(a) the opening of the housing comprises a plurality of openings, and each tubular member is disposed within a corresponding one of the plurality of openings or
(b) at least one opening of the housing comprises a slot, and each tubular member is disposed within the slot.

* * * * *